(12) United States Patent
Shumaker et al.

(10) Patent No.: US 6,289,949 B1
(45) Date of Patent: Sep. 18, 2001

(54) PRECONDITIONED AIR ADAPTER CHUTE

(75) Inventors: Wesley A. Shumaker, Washington; S. Mason Curry, Pittsburgh; Karoly Kebrer, Midland, all of PA (US)

(73) Assignee: Hall Industries Inc., Pittsburgh, PA (US)

( * ) Notice: Subject to any disclaimer, the term of this patent is extended or adjusted under 35 U.S.C. 154(b) by 0 days.

(21) Appl. No.: 09/563,277

(22) Filed: May 3, 2000

(51) Int. Cl.[7] .............................. B65B 1/04; B65B 3/00; B67C 3/00
(52) U.S. Cl. .................. 141/383; 141/113; 141/384; 141/387; 141/389; 141/391; 244/118.5
(58) Field of Search ..................... 141/113, 312, 141/382, 383, 384, 387, 389, 391; 244/118.5; 285/308, 312, 379; 277/619

(56) References Cited

U.S. PATENT DOCUMENTS

| | | | |
|---|---|---|---|
| 3,045,721 | * 7/1962 | Shepherd et al. | 141/346 |
| 3,330,313 | * 7/1967 | Rosell | 141/384 |
| 5,355,917 | 10/1994 | Kofflin . | |
| 5,740,846 | 4/1998 | Larson . | |
| 5,927,355 | 7/1999 | Kofflin . | |
| 6,116,300 | * 9/2000 | Kofflin | 141/382 |

* cited by examiner

*Primary Examiner*—Timothy L. Maust
(74) *Attorney, Agent, or Firm*—Oldham & Oldham Co., L.P.A.

(57) ABSTRACT

A preconditioned air adapter chute for attachment to a ring connector of an aircraft has a body adapted at a first end to attach a hose for transmitting the preconditioned air. The body is provided at a second end with a flange connecting to the ring connector. A compressive gasket is affixed to a surface of the flange which faces the ring connector. At least one clamp assembly, affixed to the body, has a handle and a clamp pivotably mounted in a housing. The handle and clamp are pivoted about separate pivot points, so that a cam action is obtained as the handle is moved from an open to a closed position. The clamp of each clamp assembly passes through a slot-like opening in the flange to allow engagement of the clamp in the connector.

36 Claims, 4 Drawing Sheets

PRECONDITIONED AIR ADAPTER CHUTE

The present invention relates to a device for connecting a source of preconditioned air to a receiver for the preconditioned air, typically an aircraft. The device has cam action clamps which permit easy connection and disconnection to the airliner.

BACKGROUND OF THE ART

It is common practice in the air transport industry to provide preconditioned air to an aircraft parked at a jetway from a ground source, rather than to use the craft's onboard heating or air-conditioning systems. For this reason, aircraft are typically provided with a standard hatch door and connector. When the hatch door is opened, a ground-based source of preconditioned air is connected to the connector through a length of hose, the distal end of which is attached to an adapter chute designed to mate with a standard ring connector on the aircraft. As explained in one of the prior art references, the standard for the ring connector is set by Military Standard MS 33562(ASG) entitled "Connection, Aircraft Ground Air Conditioning, 8 inch, minimum requirements."

In designing an adapter chute for attaching the preconditioned air hose to the aircraft, considerations which are considered include the weight and durability of the chute body, the reliability and ease of use of the clamps and the quality of air-tight seal obtained between the chute and the connector.

In attempting to improve the adapter chute, the designer is obviously constrained by the limitation that the chute must mate with the standard ring connector. However, the patent art demonstrates that some variation in design is clearly possible. For example, one patent notes that the type of chute previously used (in 1993) was made of metal, was cone-shaped, had no handles and had a bar-type clamp for clamping the chute to the connector. Advantages provided by that inventor include the use of high-density polyethylene instead of metal, use of a conical bottom and a cylindrical top, as well as the introduction of handles, and the use of heavy duty clamps featuring TEFLON hooks.

One type of chute assembly known in the prior art engages the ring connector by inserting L-shaped hooks through slots in the ring connector and then rotating the entire chute, while compressing it against the ring connector to allow the hooks to engage the end edges of the slots. Another type of chute assembly known in the prior art has spring-loaded latches which are inserted through the slots of the ring connector while the chute is compressed against the ring connector. These spring-loaded latches then engage the side edges of the slots. One of the patents notes the relative expense of the ring connector on the aircraft and how damage to the ring connector.

It is therefore a desired advantage not found in the prior art to provide an improved adapter chute which is compatible with the standard ring connector, but which uses a smooth and simple rotation of a handle to simultaneously compressively seal the chute to the ring connector and cause a pair of clamps to engage slots in the ring connector.

SUMMARY OF THE INVENTION

This advantage, as well as others, are provided by an adapter chute for connecting an aircraft having a connector with slots to a preconditioned air unit external to the aircraft. The adapter chute comprises a chute body, a gasket affixed to the chute body, and at least one clamp assembly. The chute body is a cylindrical body with first and second ends. The second end of the body has a radially extending flange with a pair of slot-like openings formed through the flange. The gasket is fastened to the flange on a surface facing the connector. Each of the at least one clamp assemblies has a housing, a handle and a clamp, with the handle and clamp pivoting in the housing about separate pivot points to provide a cam action.

BRIEF DESCRIPTION OF THE DRAWINGS

Better understanding of the present invention will be had when reference is made to the accompanying drawings, wherein identical parts are identified with identical reference numerals, and wherein.

DETAILED DESCRIPTION OF THE INVENTION

Figure 1:
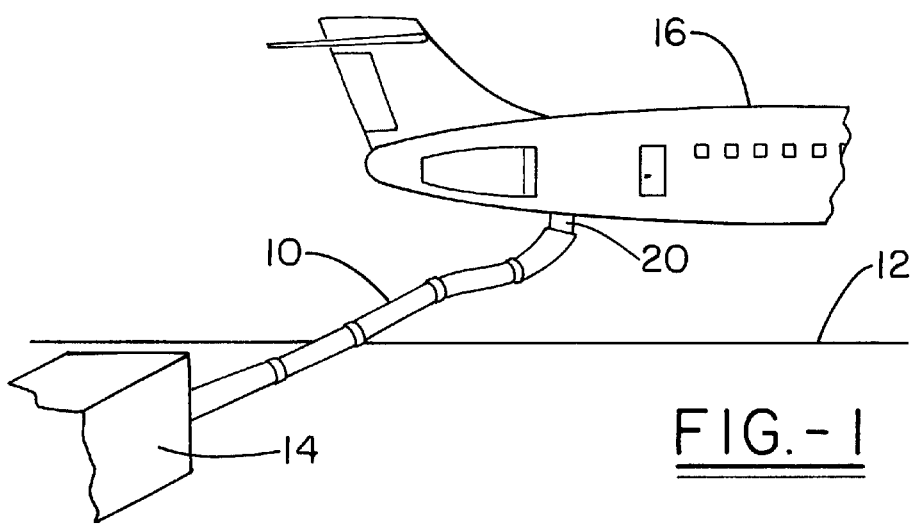
FIG. 1 is a schematic depiction of an aircraft receiving preconditioned air through a device as known in the prior art.
Figure 2:
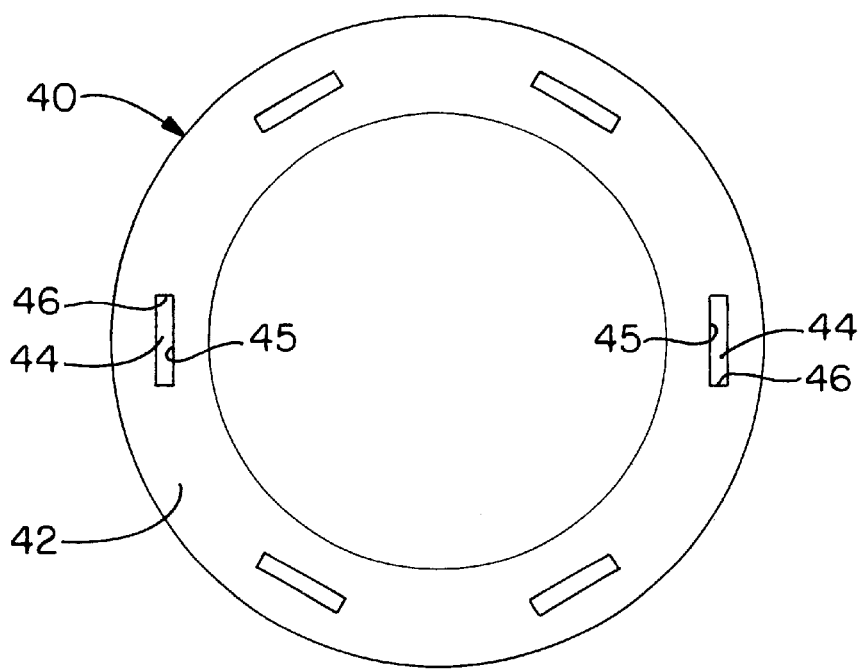
FIG. 2 is a bottom plan view of a ring connector as known in the prior art.

The use of the present invention is best understood when reference is first made to FIGS. 1 and 2, both of which are taken from U.S. Pat. No. 5,740,846 to Larson (Apr. 21, 1998). FIG. 1 shows a length of flexible hose 10 which extends along the ground 12 from a preconditioned air unit 14 to an aircraft 16. An adapter chute 20 of the prior art is shown attached to a distal end of the hose 10, a proximal end of the hose being attached to the preconditioned air unit 14. The chute 20 is removably attached to the aircraft 16 through a ring connector 40, which is not shown in FIG. 1, but is shown in isolation in FIG. 2. The ring connector 40 is mounted in the aircraft 16 inside a removable hatch (not shown) so that attachment of the adapter chute 20 to the ring connector communicates the preconditioned air unit 14 to a preconditioned air distribution system in the aircraft.

Focusing now on FIG. 2, the ring connector 40 is shown in bottom plan view, which is the view presented to the adapter chute (not shown in FIG. 2) as it is removably mated to the connector. The Larson '846 patent indicates that this connector 40 is commonly called a "mylo connector." The connector 40 is a annular ring 42 with an internal opening having an eight-inch diameter. The ring 42 is typically one-inch wide. Spaced around the ring 42 are at least one pair of diametrically opposed slots 44, and the embodiment in FIG. 2 shows three pairs of such slots. When more than one pair of opposed slots 44 is provided, the pairs will generally be equally spaced around the circumference of the ring 42. Each of the slots 44 is about one and one-half inches long, with side edges 45 that are perpendicular to a diameter of the ring 42 which would run through the longitudinal center of the slot. In addition to the side edges 45, each slot also has a pair of end edges 46. When the ring connector 40 is used with a typical chute of the prior art, only one pair of slots 44 will be engaged by a pair of opposed L-shaped clamping members. The unused pairs of slots 44 allow a chute to be attached quickly and easily with a minimal amount of rotation of the chute being required to mate the clamping members with an available pair of slots, although the unmated slots actually serve no purpose once the chute is affixed to the connector 40.

Figure 3:
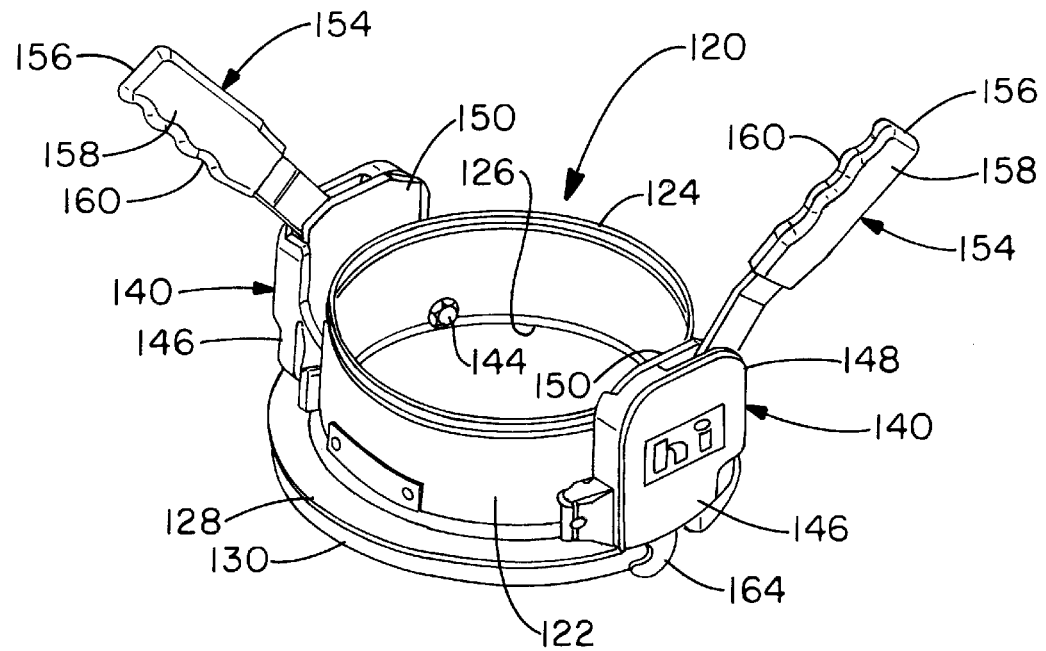
FIG. 3 is a perspective view of the adapter chute of the present invention.
Figure 4:
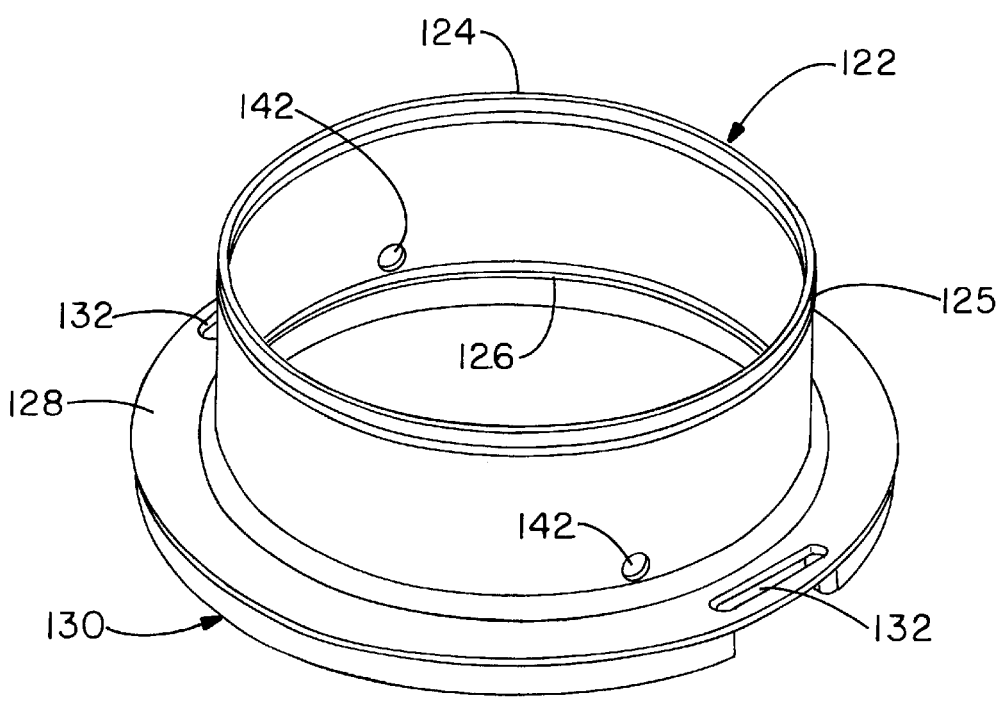
FIG. 4 is an enlarged perspective view of the body and gasket of the present invention.

Attention is now directed to FIGS. 3 and 4, where the adapter chute of the present invention, identified generally as 120, is disclosed. FIG. 3 shows an assembled perspective view of the chute 120. FIG. 4 shows the body 122 and gasket 130 of the chute 120, with the clamp assemblies 140 removed. The adapter chute 120 has a body 122. In the embodiment illustrated, the body 122 is cylindrical. The body 122 is generally hollow to permit easy flow of air therethrough from a first end 124 to a second end 126. In one aspect of the invention, the body 122 is spin formed from 0.125 inch thick aluminum plate, thereby providing a light, seamless body. The first end 124 has a slight enlargement of the diameter, to provide a collar 125 for attaching the hose (not shown in FIG. 3). At the second end 126, the body 122 is shaped into a radially extending flange 128. This radially extending flange 128 is particularly useful for mounting a resilient gasket 130, which will be compressively interposed between the body 122 and the ring connector when the chute 120 is mated with the ring connector. Although some aspects of the invention would benefit from the placement of a gusset or fillet at the intersection of the flange 128 and the body 122, it has been the inventors' experience that the spin forming of 0.125 inch thick aluminum provides more than sufficient strength to the intersection and that the only purpose of a gusset or fillet would be to add weight, which is certainly not an object of the invention. The flange 128 is also provided with a pair of diametrically opposed slot-like openings 132, which are best viewed in FIG. 4. These slot-like openings 132 are sized and located to correspond to a pair of the slots 44 in the ring connector 40. Note that body 122 is not provided with any handles or the like, the body being a simple, easily formed cylindrical structure with a flanged second end 126. This is in contrast to many prior art devices wherein the body 122 has many shapes formed therein which complicate the fabrication process needlessly, especially in the formation of handles on the body 122.

The exterior of the body 122 is adapted to have at least one clamp assembly 140 removably fastened adjacent the slot-like openings 132. In the embodiment illustrated, the body has a pair of fastening holes 142 provided for attaching a pair of clamp assemblies 140. Standard fastening means 144 will be used to attach the at least one clamp assembly 140 to the body 122. In the particular embodiment shown, for example, hex-head bolts 144 are shown as the fastening means, these bolts being received in a housing 146 of the clamp assembly 140.

Certain external features of the clamp assembly 140 are now noted. Although many of these features are shown in FIG. 3, reference should also be made to FIG. 7, which shows an exploded view of the clamp assembly. Each clamp assembly 140 use a two-piece housing 146 comprising a latch body 148 and a back plate 150. As viewed in FIG. 3, latch body 148 faces outwardly from the adapter chute 120 and has the holes for receiving the bolts 144. Latch body 148 and back plate 150 are affixed to each other to form the housing 146. Latch body 148 is shaped to define two slots. The first of these, handle slot 152, is on an upper end of the clamp assembly. This handle slot 152 defines a range of motion for handle 154, which extends upwardly therethrough. The handle 154 pivots about a first pivot point (not shown in FIG. 3) interior to the housing 146, and a first end of the handle is contained within the housing. A second end 156 of handle 154 is located outside of the housing, and this second end is usually covered with a grip 158, particularly a polymeric grip with finger receiving ridges 160 along a side thereof. These finger receiving ridges assist in orienting the assembled adapter chute for the user to make quick use thereof.

The second slot or clamp slot 162 (not visible in FIG. 3) in the latch body 148 extends out of a lower end of the clamp assembly 140. This clamp slot 162 defines a range of motion for clamp 164, which extends downwardly therethrough. The clamp 164 pivots about a second pivot point (not shown in FIG. 3) interior to the housing 146. Second pivot point is separated from first pivot point inside the housing 146, as will be explained further below. A first end of the clamp 164 is contained within the housing. A second end 166 of clamp 164 is located outside of the housing. In the aspect of the invention illustrated, the second end 166 of clamp 164 is a C-shaped hook for grasping one of the slots 44 in the ring connector. For this reason, the clamp assembly 140 is mounted onto the body so that the clamp 164 fits through one of the slot-like openings 132 in flange 128.

Figure 5:
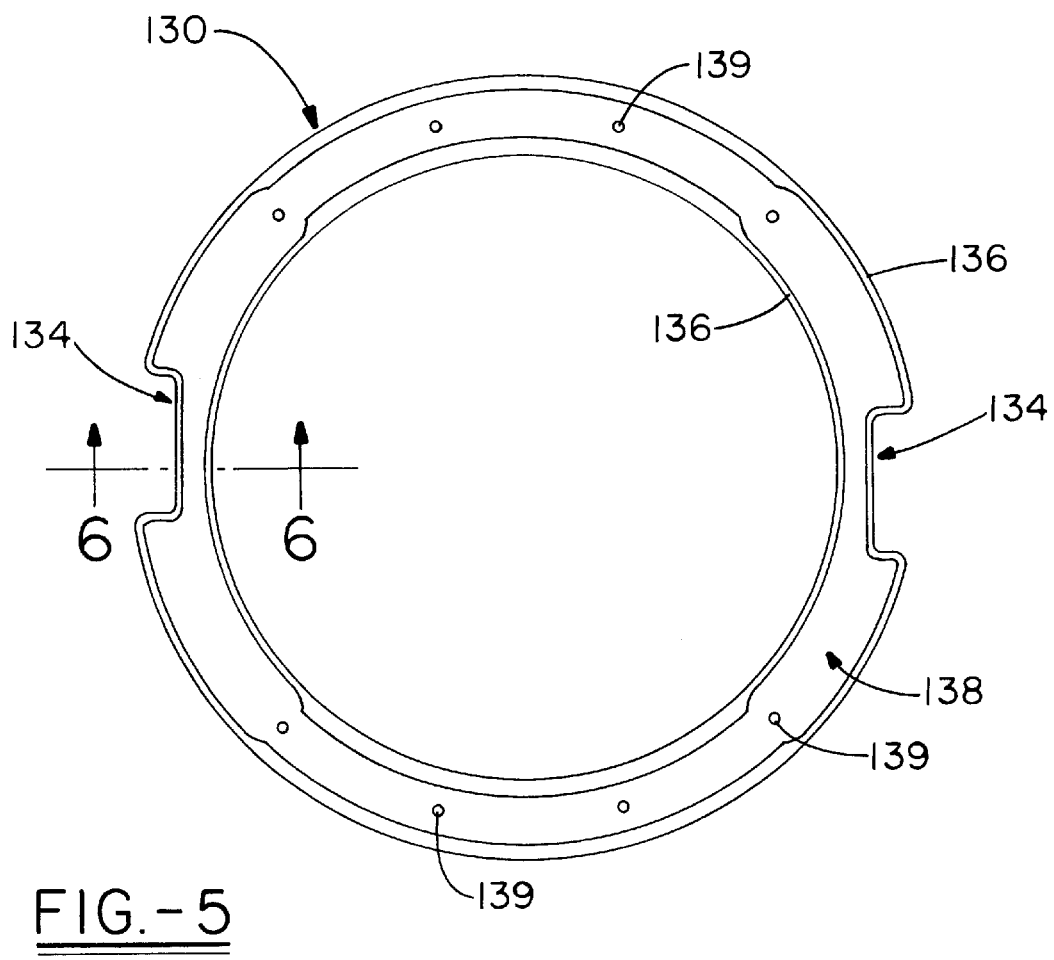
FIG. 5 is a top plan view of the gasket of the present invention.
Figure 6:
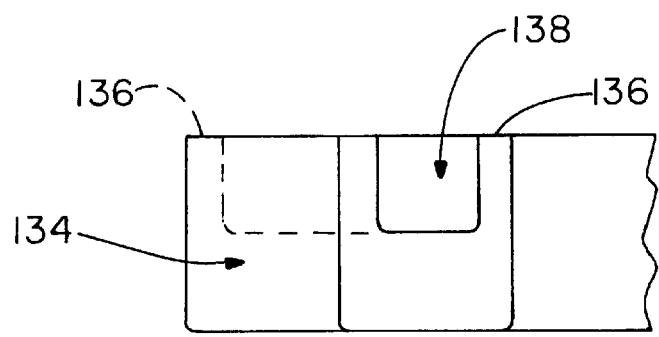
FIG. 6 is a side sectional view of a portion of the gasket, taken along line 6—6 of FIG. 5.

Attention is now directed to FIGS. 5 and 6 which show an embodiment of the gasket 130 used in the present invention. FIG. 5 is a top plan view of the gasket 130 and FIG. 6 is an enlarged side sectional view taken along line 6—6 in FIG. 5. In one aspect, the gasket 130 is molded from EPDM with a hardness of about 30, as measured on the Shore B Durometer scale. In this aspect, the gasket 130 is annular, with an inside and outside diameter sized so that the gasket may be seated on flange 128 without extending over the edges of the flange. A distinctive feature of gasket 130 is a pair of diametrically-opposed notches 134, which are sized and positioned to correspond to the slot-like openings 132 in flange 128, so that the gasket does not impede movement of the clamp 164 through or in the slot-like opening. The gasket 130 is typically about one-half inch thick, measured top to bottom, but the thickness in not uniform in the aspect of the invention illustrated. In the embodiment shown, the gasket 130 has a solid base portion which is about ¼ inch thick, with a pair of upstanding side edges 136 that form an annular channel 138 which runs around the circumference of the gasket. These upstanding side edges assist in forming a compressible but air-tight seal for the chute to the ring connector. FIG. 6 shows a side sectional view of the gasket 130 in the vicinity of one of the notches 134. In the most common embodiment of the invention, the gasket 130 is adhesively fastened to the flange 128. The appropriate adhesive will be readily determinable by one of skill in this art. The embodiment illustrated also shows a series of small holes 139, which assist in allowing adhesive weepage in the fastening procedure.

Figure 7:
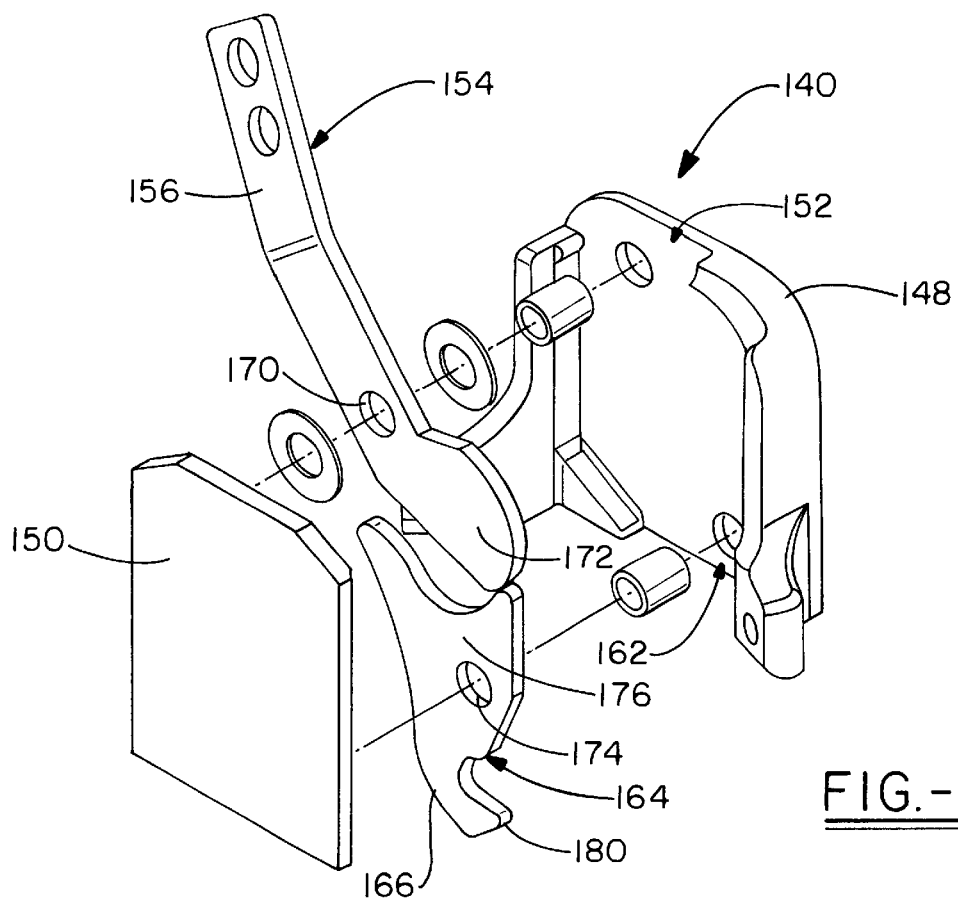
FIG. 7 is an enlarged, exploded perspective view of the clamp assembly used in the present invention.
Figures 8, 9, 10:
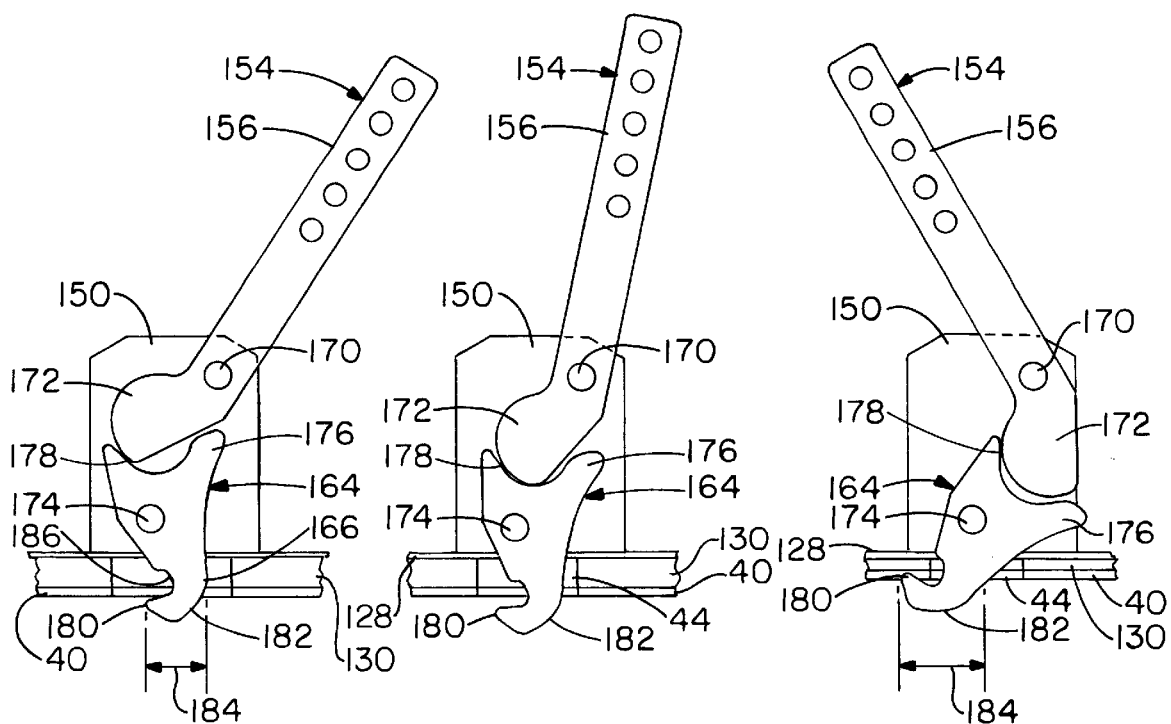
FIG. 8 is a front sectional view of the clamp assembly in a first or closed position.
FIG. 9 is a front sectional view of the clamp assembly in a second or intermediate position.
FIG. 10 is a front sectional view of the clamp assembly in a third or closed position.

Attention is now directed to FIGS. 7 and 8 through 10. FIG. 7 shows an exploded view of the clamp assembly 140, from which view the interaction of the parts may be understood. FIGS. 8 through 10 illustrate the operation of the clamp assembly 140 by showing a sectional view of the assembly. Specifically, FIG. 8 shows the clamp assembly 140 in a first or open position; FIG. 9 shows the assembly in a second or intermediate position; and FIG. 10 shows the assembly in a third or closed position. It will be understood that the particular embodiment shown shows a counterclockwise motion of the handle 154 for closing the clamp 164, but an alternate embodiment in which a clockwise motion would be used is certainly within the scope of the invention, although there is no particular reason why one would want to use such an alternate clamp assembly in combination with a counterclockwise clamp assembly. FIGS. 8 through 10 show that handle 154 pivots about a first or handle pivot point 170, which was not visible in previous views. Also, the first end 172 of the handle is now visible, so it is clear that a user causing the second handle end 156 to pivot about first pivot point 170 causes the first end to also pivot. The first end 172 has an arcuate convex outer surface. In a similar fashion, the second or clamp pivot point 174 is also now visible in FIGS. 8–10. The clamp 164 has the second end 166 which has been previously seen, but now the first end 176 is also visible. Due to the ability to pivot about second or clamp pivot point 174, motion of the first end 176 causes motion of the second end 166. The first end 176 of clamp 164 has an arcuate concave outer surface. The respective first ends 172, 176 of the handle 154 and the clamp 164 are engaged with each other as shown in FIGS. 8–10. The engagement of the respective arcuate outer surfaces and the motion of handle 154 causes a cam action in clamp 164, as illustrated by the changing position of a contact point 178 between the two outer surfaces of the respective first ends 172, 176. A tip 180 of the second end 166 of clamp 164 provides a point of contact of the clamp with the ring connector. As the clamp 164 moves from open to closed in FIGS. 8 through 10, tip 180 moves not only horizontally, but also vertically, this vertical motion causing compression of the gasket 130 between the flange 28 and the ring connector 40.

Two further aspects of the invention as shown in FIGS. 8 through 10 are notable. First, the cam action of handle 154 and clamp 164 is such that resistance is encountered by a user in moving the handle away from either the "open" or the "closed" position through the intermediate position. As a result, the handle 154 does not act as a simple pivoted lever would act, where a small push or nudge of the handle could move it out of the closed position to the open position. The cam action requires that the natural resistance of the mechanism be overcome at least through the intermediate position illustrated in FIG. 9. This feature assists in preventing inadvertent release of the clamping action.

The second feature involves the structures in the clamp 164. To appreciate certain differences from the prior art, it is useful to compare the clamp 164 as disclosed here to the clamping features disclosed in the prior art references. For example, the hook identified as reference numeral 34 in FIG. 3 of U.S. Pat. No. 5,927,355 to Kofflin is a flat L-shaped member in which the tip runs horizontally and the main body runs vertically, the tip and main body being effectively perpendicular to each other. The opposing edges of the tip are effectively parallel to each other, as are the opposing edges of the main body, although the junction of the tip and main body is radiused. Since the Kofflin '355 hook is inserted into the slot and then the adapter chute is rotated to give positive engagement, the width of the main body is necessarily smaller than the width of the slot, so no protection is provided by the hook against being inadvertently dislodged. Similarly, U.S. Pat. No. 5,740,846 to Larson shows a Kofflin-type hook at FIG. 2 and also shows his latch device at FIG. 7. The Kofflin-type hook in FIG. 2 is probably taken from an earlier Kofflin patent, U.S. Pat. No. 5,355,917.

In any case, the fact remains that Larson's spring loaded latch is clearly capable of engaging only one edge of a slot of the ring connector, since it must be able to maneuver in the slot. The Larson '846 latch may be dislodged by a strong sudden downward force on the chute. In both cases, insertion of the hook or latch onto the slot results in a narrower portion of the hook or slot residing in the slot after engagement, so that only one end or edge of the slot is actively engaged. By sharp contrast, the clamp 164 of the present invention has a C-shaped body in which a surface 182, which is opposite tip 180, is arcuate rather than flat. As a result, the effective width 184 of the clamp 164 residing in the slot of the ring connector actually increases as the clamp rotates into engagement with one end edge of the slot. In the aspect of the invention shown in FIGS. 8 through 10, when tip 180 is inserted and a notch 186 at the base of the tip abuts on one end edge of the slot, surface 182 approaches the opposite end edge of the slot so that the clamp 164 cannot be removed from the slot without rotating the clamp in the slot. In some cases, the width 184 may even increase enough that notch 186 and surface 182 each abut on the opposite slot end edges when the clamp is engaged. This aspect of the clamp 164 precludes the clamp from being dislodged from the slot through simple angular rotation of the chute or from a sharp downward force. The only way that clamp 164 disengages from the slot, once properly engaged, is through a rotation of the clamp 164 about the second pivot point 174, which, in turn, requires positive movement of the handle 154 against the cam action resistance inherent in the design. An example of the effective width 184 of clamp 164 is shown in FIGS. 8 and 10.

The operation of the device is best understood with reference to FIG. 3. To attach the chute 120 to an aircraft, the user first opens the hatch on the craft in which the ring connector is housed, exposing the outer face of the connector. The user then grasps the chute 120 by the grips 158 so that the fingers are wrapped around the finger-receiving ridges 160. The chute 120 will have a hose (not shown in FIG. 3) attached at collar 125 on the first end 124 of the chute. As the user lifts the chute 120, the handles 154 of the pair of clamp assemblies 140 should be checked to verify that both are in the "open" position as shown in FIG. 8. When this is the case, the aspect of the invention illustrated will have one arm of the user somewhat extended and the other arm somewhat flexed, since the latch assemblies 140 will both be closed by counterclockwise motion. Using the grips 158 to maneuver the chute 120, the user will approach the ring connector and insert the clamps 164 of the respective clamp assemblies into a pair of the opposed slots in the ring connector. As soon as the clamps are into the slots, the user will simultaneously rotate the handles 154 in the user's hands. The cam action of the clamp assemblies, as previously described, will pull the chute into engagement with the ring connector, compressing the gasket 130 through application of axially-directed force. The user need not actively compress the gasket 130 as the chute is engaged. The user need not apply any rotational force, which could stress the adhesion of the gasket 130 to flange 128. Once both handles 154 reach the "closed" position of FIG. 10, the chute 120 has been securely engaged. Similarly, the user who intends to disengage the chute 120 needs only to grasp the handles 154 with the fingers aligned on the finger-receiving ridges 160 on the grips 158, pull or push (as appropriate) the handles to the "open" position, and pull the chute 120 away from the hatch. In this manner, it will be understood that the grips 158 provide the only handles necessary to attach or detach the chute from the aircraft.

While the foregoing description provides examples of the best known mode of operation of the invention, the scope of the invention is not to be measured by the foregoing description, but is instead determined from the accompanying claims.

What is claimed is:

1. An adapter chute for connecting an aircraft with a connector having slots to a preconditioned air unit external to the aircraft, the adpater chute comprising:
   a cylindrical body with first and second ends, the second end having a radially extending flange, at least one slot-like opening formed through the flange;
   a gasket fastened to the flange, the gasket having an axially facing channel defined by a pair of upstanding sides; and
   at least one clamp assembly, each said clamp assembly having a housing, a handle and a clamp, the handle and clamp pivoting in the housing about separate pivot points to provide a cam action, the clamp of each clamp assembly positioned to pass through one of the at least one slot-like openings in the flange.

2. The adapter chute of claim 1, wherein the first end of the cylindrical body has a means for retaining an end of a hose connected to the preconditioned air unit.

3. The adapter chute of claim 2, wherein the retaining means is a collar formed around the circumference of the first end.

4. The adapter chute of claim 1 wherein the body is spin formed from aluminum.

5. The adapter chute of claim 1 wherein the gasket is molded from a resilient material.

6. The adapter chute of claim 1 wherein the gasket has at least one notch formed therein.

7. The adapter chute of claim 1 wherein each said clamp assembly is removably affixed to the chute body.

8. The adapter chute of claim 1 wherein each said clamp has a tip for engaging an end edge of the slot of the aircraft connector, the tip having a notch at a base thereof.

9. The adapter chute of claim 8 wherein each said clamp has an arcuate surface opposite the tip.

10. The adapter chute of claim 9 wherein an effective width of the clamp, measured from the tip to the arcuate surface, increases upon rotation of the clamp to the closed position so that the effective width is wider than a width of the slot in which the clamp is engaged.

11. The adapter chute of claim 1 wherein the cam action of each said clamp assembly compressively seals the flange to the connector by compressing the gasket therebetween.

12. The adapter chute of claim 11 wherein the clamp assembly applies only axial force to compress the gasket.

13. An adapter chute for connecting an aircraft with a connector having slots to a preconditioned air unit external to the aircraft, the adapter chute comprising:
   a cylindrical body with first and second ends, the second end having a radially extending flange, at least one slot-like opening formed through the flange;
   a gasket fastened to the flange; and
   at least two clamp assemblies, each said clamp assembly having a housing, a handle and a clamp, the handle and clamp pivoting in the housing about separate pivot points to provide a cam action, the clamp of each clamp assembly positioned to pass through one of the at least one slot-like openings in the flange;
   wherein each said clamp assembly operates independently.

14. The adapter chute of claim 13, wherein the first end of the cylindrical body has a means for retaining an end of a hose connected to the preconditioned air unit.

15. The adapter chute of claim 14, wherein the retaining means is a collar formed around the circumference of the first end.

16. The adapter chute of claim 13 wherein the body is spin formed from aluminum.

17. The adapter chute of claim 13 wherein the gasket is molded from a resilient material.

18. The adapter chute of claim 13 wherein the gasket has at least one notch formed therein.

19. The adapter chute of claim 13 wherein each said clamp assembly is removably affixed to the chute body.

20. The adapter chute of claim 13 wherein each said clamp has a tip for engaging an end edge of the slot of the aircraft connector, the tip having a notch at a base thereof.

21. The adapter chute of claim 20 wherein each said clamp has an arcuate surface opposite the tip.

22. The adapter chute of claim 21 wherein an effective width of the clamp, measured from the tip to the arcuate surface, increases upon rotation of the clamp to the closed position so that the effective width is wider than a width of the slot in which the clamp is engaged.

23. The adapter chute of claim 13 wherein the cam action of each said clamp assembly compressively seals the flange to the connector by compressing the gasket therebetween.

24. The adapter chute of claim 23 wherein the clamp assembly applies only axial force to compress the gasket.

25. An adapter chute for connecting an aircraft with a connector having slots to a preconditioned air unit external to the aircraft, the adapter chute comprising:
   a cylindrical body with first and second ends, the second end having a radially extending flange, at least one slot-like opening formed through the flange;
   a gasket fastened to the flange; and
   at least two clamp assemblies, each said clamp assembly having a housing, a handle having a hand grip thereon and a clamp, the handle and clamp pivoting in the housing about separate pivot points to provide a cam action, the clamp of each clamp assembly positioned to pass through one of the at least one slot-like openings in the flange;
   wherein each said hand grip moves substantially parallel to the flange to open or close the clamp assembly.

26. The adapter chute of claim 25, wherein the first end of the cylindrical body has a means for retaining an end of a hose connected to the preconditioned air unit.

27. The adapter chute of claim 26, wherein the retaining means is a collar formed around the circumference of the first end.

28. The adapter chute of claim 25 wherein the body is spin formed from aluminum.

29. The adapter chute of claim 25 wherein the gasket is molded from a resilient material.

30. The adapter chute of claim 25 wherein the gasket has at least one notch formed therein.

31. The adapter chute of claim 25 wherein each said clamp assembly is removably affixed to the chute body.

32. The adapter chute of claim 25 wherein each said clamp has a tip for engaging an end edge of the slot of the aircraft connector, the tip having a notch at a base thereof.

33. The adapter chute of claim 32 wherein each said clamp has an arcuate surface opposite the tip.

34. The adapter chute of claim 33 wherein an effective width of the clamp, measured from the tip to the arcuate surface, increases upon rotation of the clamp to the closed position so that the effective width is wider than a width of the slot in which the clamp is engaged.

35. The adapter chute of claim 25 wherein the cam action of each said clamp assembly compressively seals the flange to the connector by compressing the gasket therebetween.

36. The adapter chute of claim 35 wherein the clamp assembly applies only axial force to compress the gasket.

* * * * *